(12) United States Patent
Thoma et al.

(10) Patent No.: US 6,897,994 B2
(45) Date of Patent: May 24, 2005

(54) SYSTEM FOR CORRECTION OF SPATIAL CROSS-TALK AND PATTERN FRAME EFFECTS IN IMAGING SYSTEMS

(75) Inventors: Ralph Thoma, Augsburg (DE); Volker Melzer, Munich (DE); Ronian Siew, Maysprings (SG); Tobias Damm, Munich (DE); Peter Mueller, Mering (DE)

(73) Assignee: Agfa Corporation, Wilmington, MA (US)

( * ) Notice: Subject to any disclaimer, the term of this patent is extended or adjusted under 35 U.S.C. 154(b) by 38 days.

(21) Appl. No.: 10/336,413

(22) Filed: Jan. 3, 2003

(65) Prior Publication Data

US 2004/0057118 A1 Mar. 25, 2004

Related U.S. Application Data

(60) Provisional application No. 60/394,123, filed on Jul. 3, 2002.

(51) Int. Cl.$^7$ .............................................. G02B 26/00
(52) U.S. Cl. ...................................... 359/292; 359/318
(58) Field of Search ................................ 359/292, 295, 359/298, 318, 572, 573

(56) References Cited

U.S. PATENT DOCUMENTS

| | | | |
|---|---|---|---|
| 3,697,149 A | * 10/1972 | Van Heeckeren et al. | .. 369/103 |
| 3,813,685 A | * 5/1974 | St. John | ........................ 348/41 |
| 4,007,481 A | * 2/1977 | St. John | ........................ 348/41 |
| 5,237,435 A | 8/1993 | Kurematsu et al. | |
| 5,471,341 A | * 11/1995 | Warde et al. | ................ 359/293 |
| 6,084,626 A | 7/2000 | Ramanujan et al. | |
| 6,323,984 B1 | 11/2001 | Trisnadi | |
| 6,433,934 B1 | 8/2002 | Reznichenko et al. | |
| 6,479,811 B1 | * 11/2002 | Kruschwitz et al. | .... 250/237 G |
| 6,577,429 B1 | * 6/2003 | Kurtz et al. | ................ 359/279 |

FOREIGN PATENT DOCUMENTS

EP        1143287        10/2001

* cited by examiner

Primary Examiner—Ricky Mack
(74) Attorney, Agent, or Firm—William Hilton; Robert A Sabourin

(57) ABSTRACT

An imaging system is disclosed that includes an illumination source, a diffractive modulator, imaging optics, and a coherence reduction system. The illumination source is for producing an illumination field. The diffractive modulator is for receiving the at least partially coherent illumination field and producing a modulated illumination field. The imaging optics are for directing the modulated illumination field toward an imaging surface. The coherence of one of the illumination field and the modulated illumination field is reduced.

8 Claims, 7 Drawing Sheets

US 6,897,994 B2

SYSTEM FOR CORRECTION OF SPATIAL CROSS-TALK AND PATTERN FRAME EFFECTS IN IMAGING SYSTEMS

This application claims priority to U.S. Provisional Patent Application Ser. No. 60/394,123 filed Jul. 3, 2002.

BACKGROUND OF THE INVENTION

The invention generally relates to imaging systems, and particularly relates to systems and methods for producing high quality images using light modulators such as diffractive light modulators.

Systems for producing high quality images using light modulators typically include an illumination source for producing an illumination field, a light modulator for receiving the illumination field and for producing a modulated illumination field, and imaging optics for directing the modulated illumination field toward an imaging surface. For example, U.S. Pat. No. 6,433,934, the disclosure of which is hereby incorporated by reference, discloses an imaging system that includes an illumination source (e.g., an array of laser diode emitters), a field lens system, a light modulator, imaging optics and an imaging drum for supporting recording media.

Other systems, such as that shown in FIG. 1, may include an illumination source 10 having high power laser beams (800 nm–1064 nm to 40 Watts output) that are generated by one or more lasers for exposing film or infra-red (IR) sensitized media at an imaging plane 20. The system further includes a light modulator 12, a first lens 14 having a focal length of $f_1$, a pupil 16, and a second lens 18 having a focal length of $f_2$. The IR sensitized media is selectively exposed to create half-tone images onto imaging media (often referred to as plates) used by press systems in publishing. The media is then chemically processed and fed into a press system for printing and publishing. The high power laser beam that is generated may form a line of illumination that may be directed toward, and subsequently selectively reflected by, the spatial light modulator or grating light valve (GLV) 12. As shown in FIG. 2, a grating light valve may include ribbons 21, 22, 23, 24, 25, 26 that permit the selective imaging of each individual pixel onto the imaging media. The ribbons may each have a length L, a width w and a ribbon center to center distance a. For example, Silicon Light Machines of Sunnyvale, California sells grating light valves suitable for imaging. During operation, ribbons 21, 23 and 25 may be selectively activated to provide either a smooth reflective surface (when aligned with ribbons 22, 24 and 26) or a diffractive surface (when moved ¼ wavelength with respect to ribbons 22, 24 and 26). With reflective light modulators, the first order reflection may for example, be used for imaging, while a second order (and to a lesser extent third and fourth order etc.) reflected fields may produce unwanted illumination that is filtered out in the Fourier plane by a slit diaphragm.

Typically, a portion of a light modulator may be selectively activated to either illuminated or not illuminate an individual pixel at an imaging surface. Through this method, half tone imaging may be accomplished. Each individual pixel may be selected to be either on or off. It has been found, however, that non-linear diffraction behavior may occur in certain high quality imaging system, particularly if only a single pixel or a small group of pixels are illuminated in a relatively larger area of the imaging surface. This non-linear diffractive behavior may result in a single pixel or small group of pixels having either too strong an intensity or a poorly defined boundary for the pixel or pixels.

There is a need, therefore, for a high resolution imaging system having improved image quality.

SUMMARY OF THE INVENTION

An imaging system is disclosed that includes an illumination source, a diffractive modulator, imaging optics, and a system for reducing coherence and spatial cross-talk effects. The illumination source is for producing an illumination field. The diffractive modulator is for receiving the at least partially coherent illumination field and producing a modulated illumination field. The imaging optics are for directing the modulated illumination field toward an imaging surface. The coherence reduction system is for reducing the coherence of one of the illumination field and the modulated illumination field.

BRIEF DESCRIPTION OF THE DRAWINGS

The following description may be further understood with reference to the accompanying drawings in which.

The drawings are show for illustrative purposes and are not to scale.

DETAILED DESCRIPTION OF THE ILLUSTRATED EMBODIMENTS

It has been discovered that the diffraction behavior of a diffractive modulator is influenced by the modulator frame and the dimension of the activated diffractive units. The modulator frame includes the border and transition between the diffractive units and the non-diffractive parts. The influence of the frame or the dimension of the cooperating activated diffractive units results in non-linear diffraction behavior if only single pixels or small groups of neighboring pixels are activated. The lateral intensity distribution in the image plane is influenced by the number of diffractive units due to cooperation and coupling effects of activated diffractive structures. This non-linear diffraction behavior is similar to spatial cross-talk, and may be important in applications involving high contone illumination demands such as photo finishing.

The diffractive intensity distribution of a diffractive modular varies with the number of activated diffractive units. A broad, homogeneously illuminated rectangular intensity profile may be observed in the image plane for a long (many diffractive units) and completely activated diffractive modulator. The intensity profile corresponds to the borders of the diffractive modulator, and exhibits an exponential or Gaussian decrease of the intensity at the frame (depending of course, on the apodization function in the Fourier place). If, however, a single diffractive unit or only a few neighboring diffractive units are activated then the intensity profile in the image plane is affected by the diffraction effects of the frame of the activated diffractive parts. The deviation from linear illumination behavior increases with decreasing the number of activated diffractive units.

Figure 3:
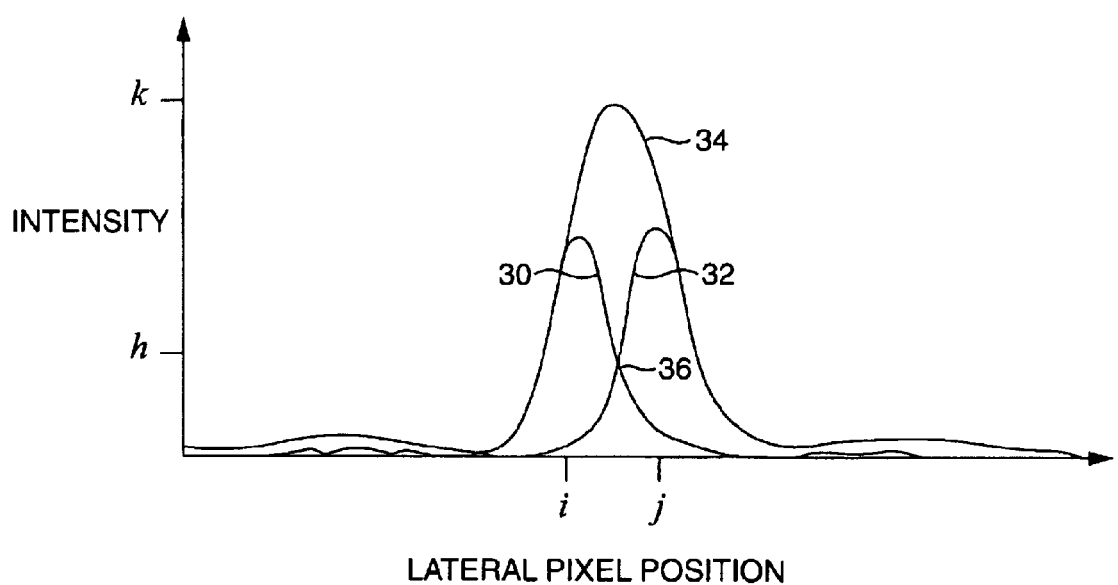
FIG. 3 shows an illustrative graphical view of the intensity of illumination of two adjacent pixels using coherent illumination.

For example, as shown in FIG. 3, when two adjacent pixels i and j are illuminated, the intensity of the resulting illumination may appear to be much greater than the intensity of the illumination from either pixel individually. In particular, the intensity of the illumination of pixel i may be as shown at 30 and the intensity of the illumination from pixel j may be as shown at 32. When both pixels are illuminated with coherent illumination, however, the combined illumination (as shown at 34) may have an intensity k as shown at 34 that is approximately four times greater than the intensity h at the pixel cross-over point (shown at 36). This may cause an illumination system to exhibit non-linear responses in certain cases. It has been discovered that the spatial coherence of the illumination source affects the linearity of the spatial optical cross talk.

Several mathematical-electronic correction mechanisms may be applied, or changes in the design of the diffractive modulator may be accomplished to achieve a complete linear intensity in the image plane. Briefly, at least the following five correction mechanisms may be employed to address this source of the non-linearity. First, mathematical-electronic correction may be applied by Fourier transformation of the diffractive pattern, as well as corresponding normalization of the diffraction intensity, to achieve a linear illumination intensity behavior. Second, a pixel typically consists of several diffractive units. If the diffractive contribution of these units is modulated separately then the diffractive behavior may be corrected to achieve a linear response. This requires an additional electronic control for the inner (over-) modulation of the diffractive units. Third, moderate lateral separation of the pixels by non-diffractive space decreases the cooperative effect between neighbored pixels and results in a better linear illumination intensity behavior of the diffractive modulator. Fourth, an increase of the number of diffractive units per pixel results in a reduction of the frame effects of diffraction. Hence, better linear illumination intensity behavior of the diffractive modulator may be achievable with a higher number of diffractive units per pixel. Fifth, an inherently low spatial coherent light source may be used, or the spatial coherence of the illumination source may be decreased such as by using an extended source. This will render the illumination across the GLV array to be partially coherent. The spatial coherence is enough for ribbon-ribbon interference to enable single pixel modulation but not enough to cause pixel-to-pixel interference or cross-talk. These correction procedures and mechanisms may be used to reduce the frame effects of diffraction and to achieve better linear illumination intensity behavior of the diffraction module in the image plane. Contone performance of the diffractive modulator is also enhanced.

Figure 4:
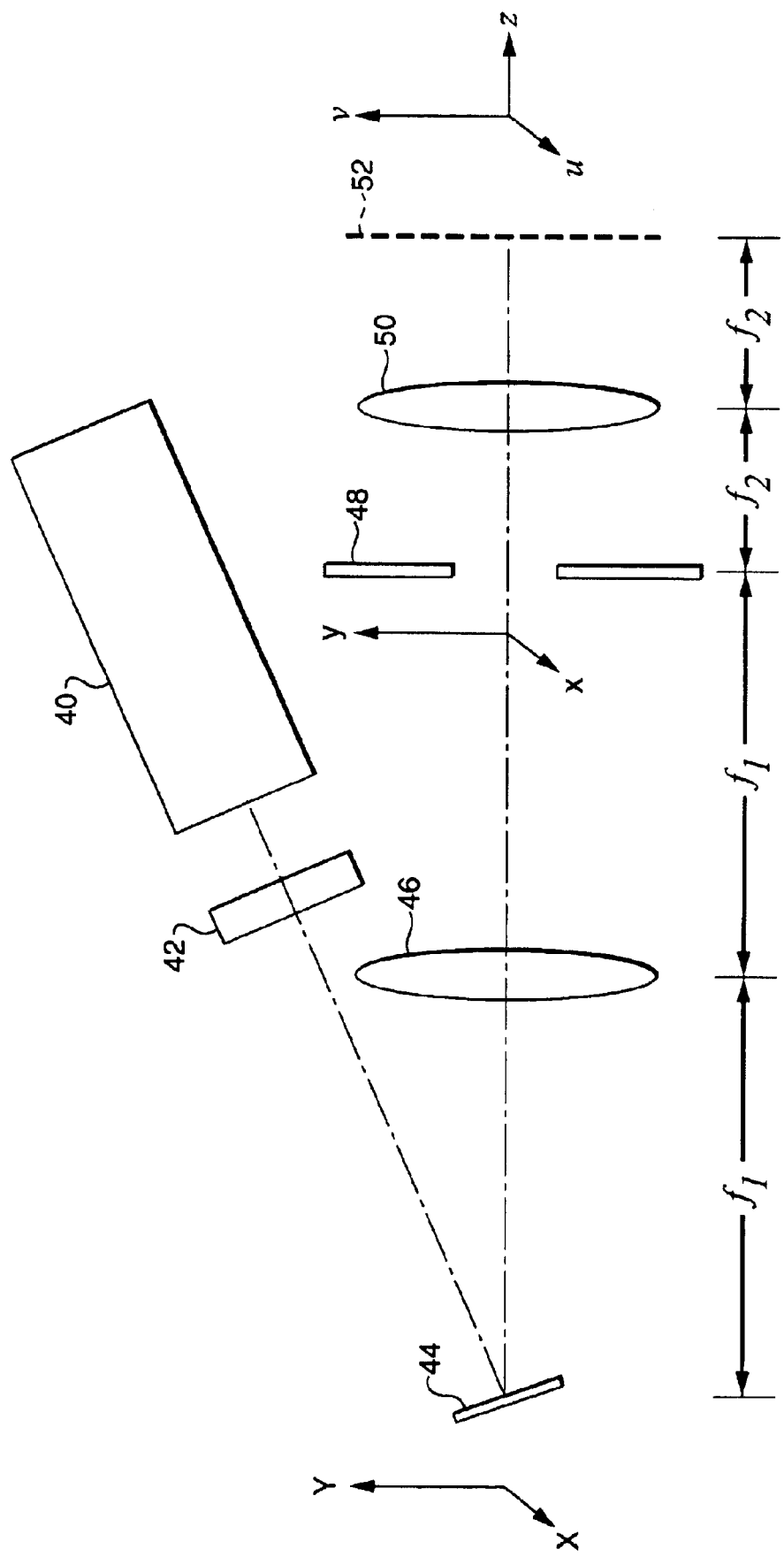
FIG. 4 shows an illustrative diagrammatic view of an imaging system in accordance with an embodiment of the invention.

In accordance with an embodiment of the invention, an imaging system as shown in FIG. 4 may be used, including a laser line illumination source 40, a spatial coherence reduction system 42, a GLV 44, a first lens 46, a pupil 48, a second lens 50 and an imaging plane 52. The illumination source 40 may be a laser diode bar that is centered at 815 nm +/−10 nm. This source provides a line illumination across the GLV pixel array in the X direction and the optical system forms the GLV image with a demagnification of $(f_1/f_2)^{-1}$, where $f_1$, is the focal distance on either side of the first lens 46 as shown and $f_2$ is the focal distance on either side of the second lens 50 as shown. This demagnification may be for example, approximately $(154 \text{ mm}/32 \text{ mm})^{-1} \approx 4.8^{-1}$. This is an example of an imaging system that may be used in prepress systems. In various embodiments, the system may image the $0^{th}$ order image or the $1^{st}$ order image etc. as desired. In further embodiments, the illumination source 40 may include a gas discharge source and the system 42 may include optics for imaging the entire discharge tube length to fit onto the GLV line surface.

This system exhibits telecentricity and may be modeled as a telecentric space-invariant optical system with infinite lens diameters. In this case, the effects of optical aberrations and diffraction from the lens edges are ignored and the two-lens system forms a perfect image of the GLV at the u,v plane. GLV pixels behave like a mirror when they are formed to expose plates with the illumination they receive from a laser source. If a pixel is nor to expose a plate, the reflected light is switched off by optical interference effects. Because of the mirror like behavior of GLV pixels in the on state any irradiance (W/m²) distribution incident on the GLV from the laser illumination is relayed by the two-lens system onto the u,v plane. Therefore, the irradiance distribution on the u,v plane is exactly the distribution at the CLV but just changed in magnification. The laser illumination on the GLV is designated to have a Gaussian in they dimension and a rectangular top-hat distribution in the X dimension. The simulated irradiance distribution of a single GLV pixel at the u, v plane may by written as $$I(u, v) = \frac{P}{wL}\sqrt{\frac{2}{\pi}} e^{-2(\frac{v}{w})^2} \qquad (1)$$

where p is the power in this pixel, w if the 1/e² half width of the Gaussian, and L is the length if the pixel in the U dimension. The creation of a half tone dot on for example, a photographic film on the imaging plane, is achieved by scanning this GLV pixel image across the film for the time duration T=L/V where L is again the u dimension length of the pixel and V is the scan velocity. This scan results in an exposure EXP(u,v) delivered to the image plane that may be written as the one-dimensional convolution $$\text{Exp}(u, v) = \int_{-\infty}^{\infty} I(u, v - Vt)m(t)dt \qquad (2)$$

where m(t)=1 for $0 \leq T \leq T$, and m(t)=0 otherwise. If the film used has a threshold condition for exposure, the half tone dot area will have a reflectance of density profile that is perfectly square. On the other hand, if the film behaves like ordinary photographic film, the expose area will have a transmittance or density profile that is a top-hat in the u dimension and Gaussian in the v dimension. Since the illumination used is from a laser source, each pixel is expected to have some degree of coherence with respect to the other pixels.

Figure 1:
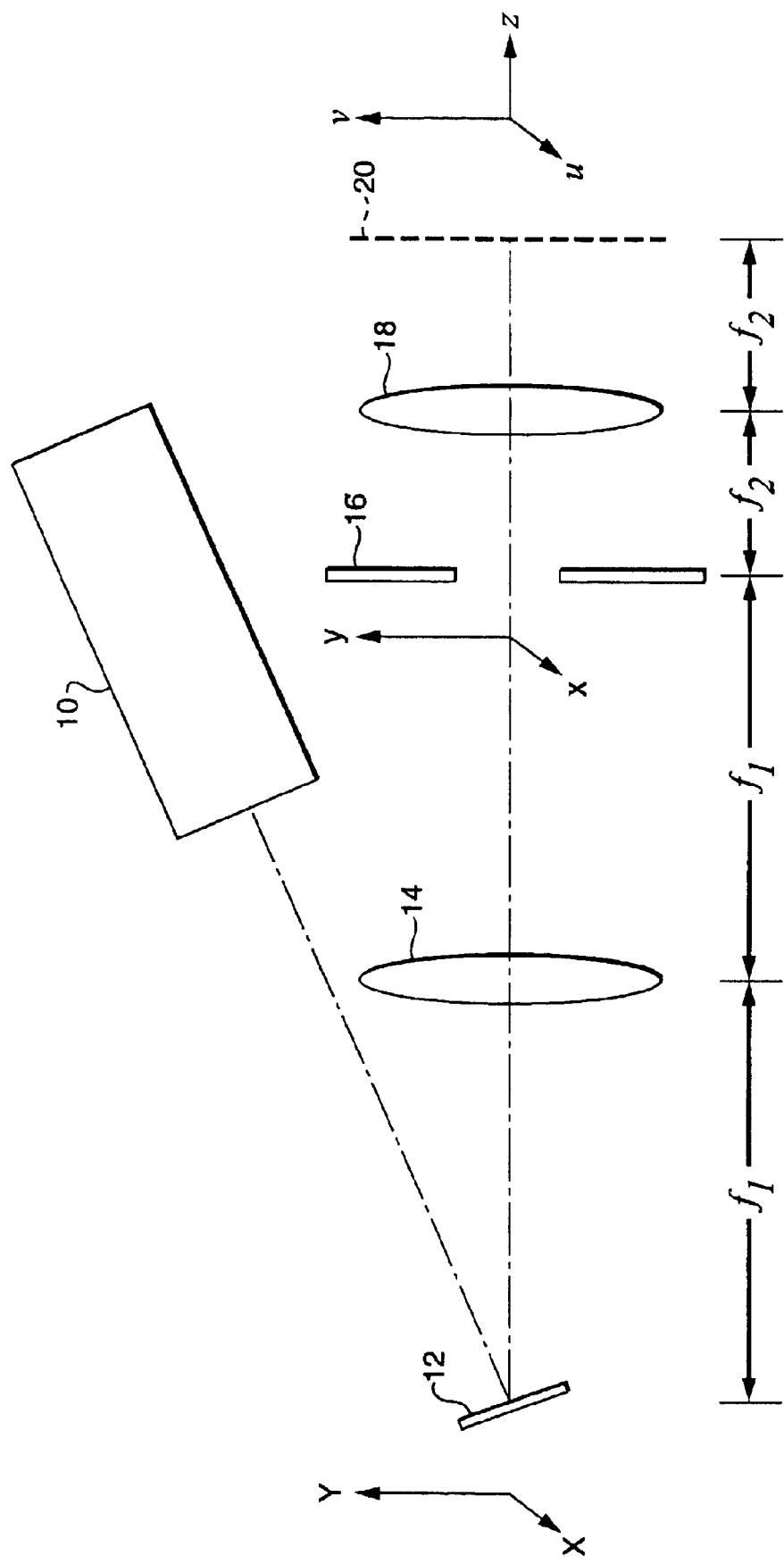
FIG. 1 shows an illustrative diagrammatic view of a prior art imaging system.
Figure 2:
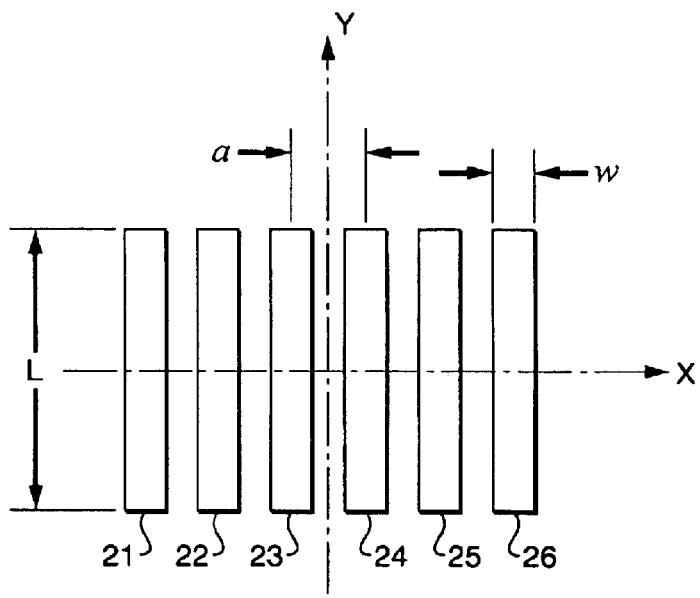
FIG. 2 shows an illustrative diagrammatic plan view of a portion of the grating light valve shown in FIG. 1 that forms a pixel in the imaging plane in accordance with the prior art.

As shown in FIG. 2, a GLV pixel may consist of six metallic strips or ribbons 21, 22, 23, 24, 25, 26 of width w~3.65 µm and length L~µm. The gap between ribbons is ~0.6 µm yielding a center separation a between ribbons of ~4.25 µm. In principal, to use this pixel as a light modulator, one illuminates it with monochromatic plane waves of wavelength λ and collects the reflected light with imaging optics such as that shown in FIG. 1. The coordinates X and Y in FIG. 2 are the same as in FIG. 1 so that the array of ribbons is along the X-axis of FIG. 1. The light reflected off the pixel is switched off by deflecting the mobile ribbons 21, 23, 25 an amount d=λ/4. As a result, light reflected off the deflected ribbons result in a phase shift of 4 πd/λ=π with respect to the undeflected ribbons 22, 24, 26. This resulting destructive interference among the reflected light waves makes it possible to switch the pixel image off.

The scalar intensity distribution at the pupil plane resulting from the monochromatic illumination of a single GLV pixel may, based on the Fraunhofer diffraction integral, be written as:

$$I(x, y) \propto \mathrm{sinc}^2\left(\frac{kLy}{2f_1}\right)\mathrm{sinc}^2\left(\frac{kwx}{2f_1}\right) \quad (3)$$

$$\left|e^{-i2kd}\left(e^{\frac{ikax}{2f_1}} + e^{\frac{ik3ax}{2f_1}} + e^{\frac{ik5ax}{2f_1}}\right) + \left(e^{\frac{ikax}{2f_1}} + e^{\frac{ik3ax}{2f_1}} + e^{\frac{ik5ax}{2f_1}}\right)\right|^2$$

The phase factor i2kd in equation (3) should be multiplied by cos θ where θ is the angle of incidence of the illumination in FIG. 4. However, if θ=0 for simplicity, then the plot of equation (3) for the x axis with d=0 and d=λ/4 provides a central bright maximum is when d=0 that is referred to as the $0^{th}$ order light while the other lower maximums are referred to as the $+/-2^{nd}, 4^{th}, \ldots$ etc. orders. When d=λ/4, two bright maximum appear to the right and left of the $0^{th}$ position and are called the $+/-1^{st}$ orders. If the aperture in FIG. 1 is used to block the $+/-1^{st}$ orders and only let pass the $0^{th}$ order light, then on/off switching of the GLV pixel is realized. Of course, the $0^{th}$ order light may be blocked instead, permitting the $+/-1^{st}$ orders to pass.

Consider the case of two GVL pixels, separated by an arbitrary center-to center distance and illuminated by monochromatic light of wavelength λ. In this case, we may write the total intensity of the two pixels at the pupil plane $$I_{tot} \propto |E_1(x, y) + E_2(x, y)|^2 = \quad (4)$$

$$E_1(x, y)\tilde{E}_1(x, y) + E_2(x, y)\tilde{E}_2(x, y) + 2\mathrm{Re}[E_1(x, y)\tilde{E}_2(x, y)] =$$

$$I_1(x, y) + I_2(x, y) + 2\mathrm{Re}[E_1(x, y)\tilde{E}_2(x, y)]$$

where $E_1(x, y)$ and $E_2(x, y)$ are the total electric field amplitudes from pixels 1 and 2 respectively, and the $\tilde{E}$ denotes their respective complex conjugates. The total intensity of each pixel separately may be switched on and off in the manner described with reference to FIG. 1. However, the presence of the third term in equation (4) above implies interference effects between the two pixels when both are illuminated by the same monochromatic source. Interference exists therefore, between two pixels if the illumination on the GLV is coherent. This interference is at least partially responsible for causing the spatial cross-talk. Further, pixel images will form at the image plane, and, in general, since light entering the optical system has to pass through the aperture at the pupil plane, diffraction through the aperture will cause the pixel images to be smeared to some degree. Therefore, two pixel images are expected to overlap a little so that the overlapping image regions will undergo interference. If this happens, the intensity distribution of these two pixel images may be expressed as $$I_{tot}(u, v) \propto |E_1(u, v) + E_2(u, v)|^2 = \quad (5)$$

$$E_1(u, v)\tilde{E}_1(u, v) + E_2(u, v)\tilde{E}_2(u, v) + 2\mathrm{Re}[E_1(u, v)\tilde{E}_2(u, v)] =$$

$$I_1(u, v) + I_2(u, v) + 2\mathrm{Re}[E_1(u, v)\tilde{E}_2(u, v)]$$

Conservation of energy implies that $$\int_{Pupil\ Area}\int I_{tot}(x, y)dxdy = \int_{Image\ Area}\int I_{tot}(u, v)dudv \quad (6)$$

Thus, equating terms between equations (4) and (5) yields $$\int_{Pupil\ Area}\int \mathrm{Re}[E_1(x, y)E_2(x, y)]dxdy = \quad (7)$$

$$\int_{Image\ Area}\int \mathrm{Re}[E_1(u, v)E_2(u, v)]dudv$$

The pixel interference effects observed at the pupil plane, therefore, give rise to pixel interference effect at the image plane. Although these two effects may manifest themselves in different ways in intensity, large area photodetectors placed at the pupil plane and at the image plane should measure the same power effects as implied by the integrals of equations (6) and (7).

Two neighboring pixels therefore, may undergo interference if their electric field distributions at the image plane overlap. If the system is shift invariant, the image distribution and object distribution are related by a convolution of the de-magnified object distribution with the point spread function. Therefore, a single GLV pixel image may be considered as being formed by the superposition of ribbon images at the image plane in accordance with Fourier optics. When illuminated by coherent light, a GLV pixel image results from the coherent superposition of the six individual ribbon images that make up that pixel. With reference to FIG. 1, the lens 14 takes the Fourier transform of the field amplitude distributions at the X-Y plane, and the lens 18 takes the Fourier transformation of the field distributions at the x-y plane to form the image. When the lenses are taking the Fourier transform, they are performing the transform of the sum of ribbon field amplitudes from the object plane. The Fourier transform of the sum of ribbon field amplitudes is the same as the sum of the individual transforms due to the linearity theorem of Fourier transforms. The electric distribution of these ribbon images interfere coherently wherever they overlap on the image plane. When every other ribbon is deflected by λ/4, the superposition of ribbon images results in destructive interference. Most of the energy is re-distributed to the $+/-1^{st}$ orders at the pupil plane and the total pixel image appears dark. According to the Abbe theory of image formation, the pupil plane contains all the spatial frequencies required for the lens 18 to synthesize and reproduce the image of the object. Higher spatial frequencies are distributed throughout the higher diffractive orders along the x axis of the pupil plane. These high spatial frequencies are responsible for reproducing the sharp edges of the object at the image plane. Therefore, by masking the +/−1$^{st}$ orders and other higher orders, the ribbon images are blurred or smeared out, allowing for them to overlap. If the +/−1$^{st}$ and higher orders are allowed to pass through the pupil, higher spatial frequencies are let pass for the lens 18 to create very sharp images of the ribbons. If the ribbon images are sharp enough so that there is no overlap, coherent interference cannot occur. As a result, the pixel cannot be switched on and off.

An important parameter in a prepress optical system is a modulated pixel's contrast ratio. The contrast ratio of a pixel is defined as the ratio of its on power to its off power. To mathematically describe the pixel at the image plane the Abbe theory of GLV operation may be employed, which is to superpose ribbon images coherently. Following this, the total field amplitude of a GLV pixel at the image plane may be expressed as $$E_{pixel}(u, v) = [E_1(u, v) + E_3(u, v) + E_5(u, v)]e^{i2kd} + [E_2(u, v) + E_4(u, v) + E_6(u, v)] \quad (8)$$

where odd and even numbers are given to the mobile and stationary ribbons respectively. If the odd amplitudes are grouped into one function F1 (u,v) and even amplitudes into one function F2 (u,v), the total intensity if equation (8) may be written as $$I_{Pixel}(u, v) \propto |E_{Pixel}(u, v)|^2 = |F1(u, v)e^{-i2kd} + F2(u, v)|^2 = \quad (9)$$
$$|F1(u, v)|^2 + |F2(u, v)|^2 + 2|F1(u, v)||F2(u, v)|\cos(2kd)$$

When a photodetector is used to measure the total power ($P_{pixel}$), $$P_{pixel} \propto A + B \cos(2kd), \quad (10)$$

where A and B are the integrals over the detector area of the first two terms and last terms respectively in equation (9). Note that, when the ribbons are un-deflected, d=0 so that $P_{pixel} \propto A+B$. When the ribbons are deflected, d=$\lambda$/4, and since k=2$\pi$/$\lambda$, $P_{pixel} \propto A-B$, which represents the off power of the pixel. Thus the ratio (A+B)/(A−B) is the contrast ratio of the pixel.

To determine whether interference exists between adjacent GLV pixel images, the simplest experiment would be to profile two adjacent GLV pixel images at the image plane separately and compare the combined intensities with that which would be expected if their images were to sum coherently. As shown in FIG. 3, if the illumination on the GLV is coherent, the peak intensity 34 will far exceed the sum of the two adjacent pixel images 30 and 32 respectively. If fact, the peak 34 would be about four times the height of the midpoint of intersection 36 between the two pixels.

Figure 5A:
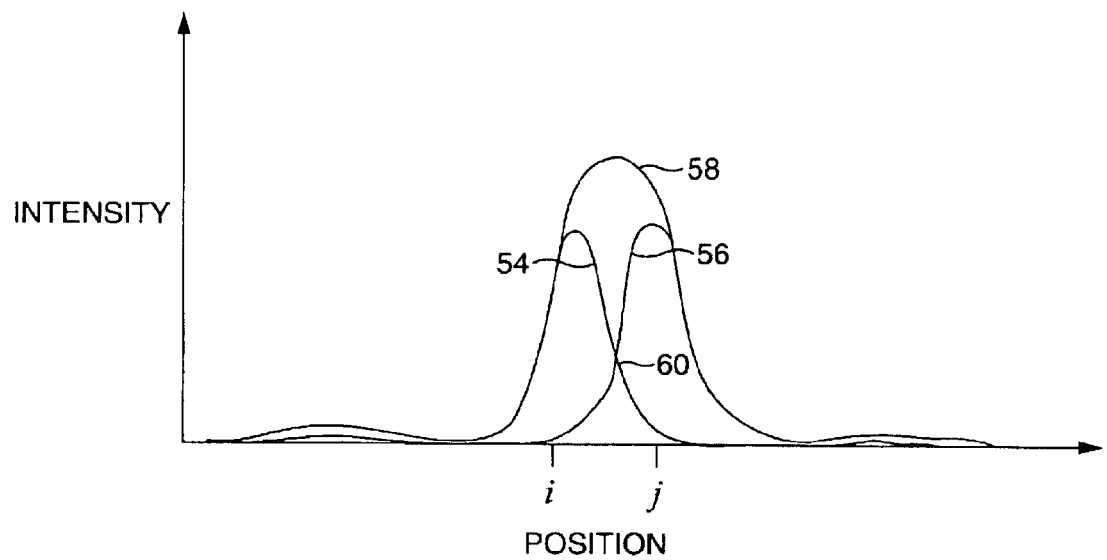
FIG. 5A shows an illustrative graphical view of the intensity of illumination of two adjacent pixels using partially coherent illumination.

If the illumination field on the GLV is made only partially coherent or incoherent, the peak intensity of two adjacent pixels should be reduced. As shown in FIG. 4, an imaging system may including an illumination source 40, a system 42, a GLV 44 lenses 46 and 50, a pupil 48 and an imaging plane 52. The diffuser 42 renders the illumination on the GLV to be either incoherent or partially coherent. The result is that the peak intensity is reduced. As shown in FIG. 5A if the coherence is reduced such that the illumination is only partially coherent, then the peak intensity 58 is reduced to about three times the midpoint of the intersection 60 of the intensity values 54, 56 of the two pixels i and j respectively.

Figure 5B:
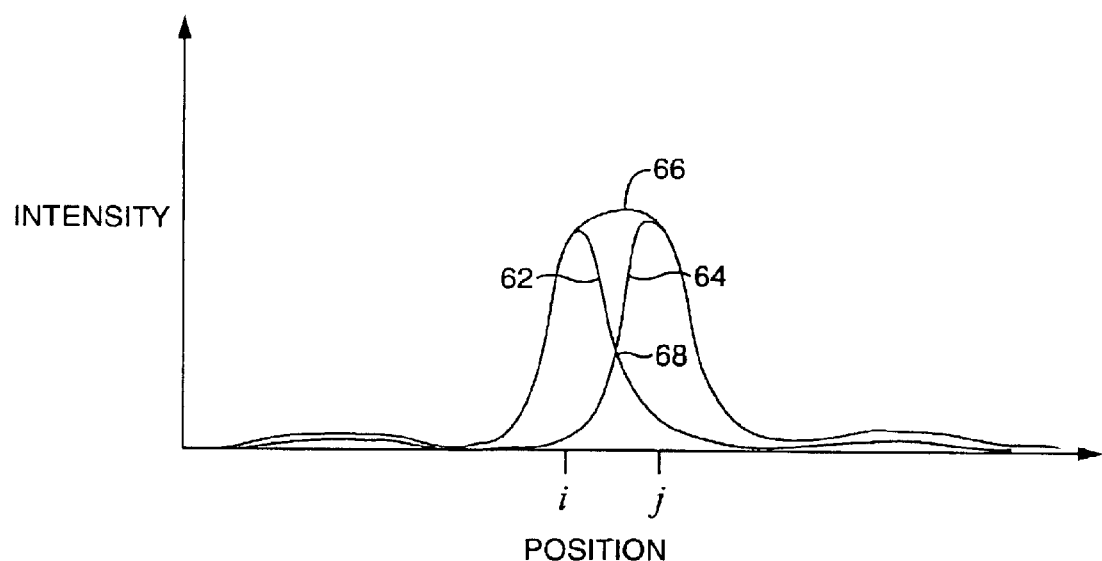
FIG. 5B shows an illustrative graphical view of the intensity of illumination of two adjacent pixels using incoherent illumination.

If the coherence is further reduced such that the illumination is incoherent, then the peak intensity 66 is further reduced to approximately twice the intersections 68 of the intensity values 62, 64 of the pixels i and j respectively as shown in FIG. 5B.

The presence of the interference term adds extra energy. The pixel-pixel interference shown in FIG. 5B behaves as if the intensities add incoherently. However, partially coherent pixel-pixel interference has been observed. In this case, the illumination was an Argon-ion laser centered at 514.5 nm coupled to an optical fiber where it was focused and spatial filtered before illuminating the GLV. In the setup, only the −1$^{st}$ order for imaging was employed. By using a 2 $\mu$m wide slit at the imaging plane, two adjacent GLV pixels were scanned individually and then together. The peak of the double pixel intensity is higher than the peak of their mathematical sum. If there were completely coherent interference, the peak of the double pixel would have been 4 times the height if the center of intersection between the two pixels. But the peak is roughly only 3.5 times therefore, the optical system appears to be a partial coherent system, but still quite close to full coherence.

Mathematical formulation for explaining partial coherence of pixel-pixel interference may be simplified in the following way. If the illumination source of FIG. 4 is quasi-monochromatic, one can expect to have the complex degree of coherence multiplying each interference term in equations (3) and (8) with the same principles that describe double slit interference. The complex degree of coherence may be modeled using a simple Gaussian function given by $$\gamma(s) = e^{-(s/q)^2} \quad (11)$$

where s is the ribbon center-to-center separation on the GLV plane q~6 microns. The peak of the two pixels turned on is about twice the height of the midpoint of intersection between them. This demonstrates incoherent pixel-pixel interference but coherent ribbon-ribbon interference for obtaining single pixel on/off modulation. This simplified model demonstrates the effects of partial coherence on the formation of GLV pixel images. In the model $\gamma(4.25)$~0.6. The degree of spatial coherence required for GLV operation is not very high and may be comparable to the degree of spatial coherence from the illumination of the Sun on the Earth. Therefore, a partial coherent description of a GLV optical system together with the Abbe theory provides useful and insights into the physics of GLV operation. Also, this provides an example of how to form GLV pixel images without pixel-pixel interference, thus eliminating cross-talk effects.

Figure 6:
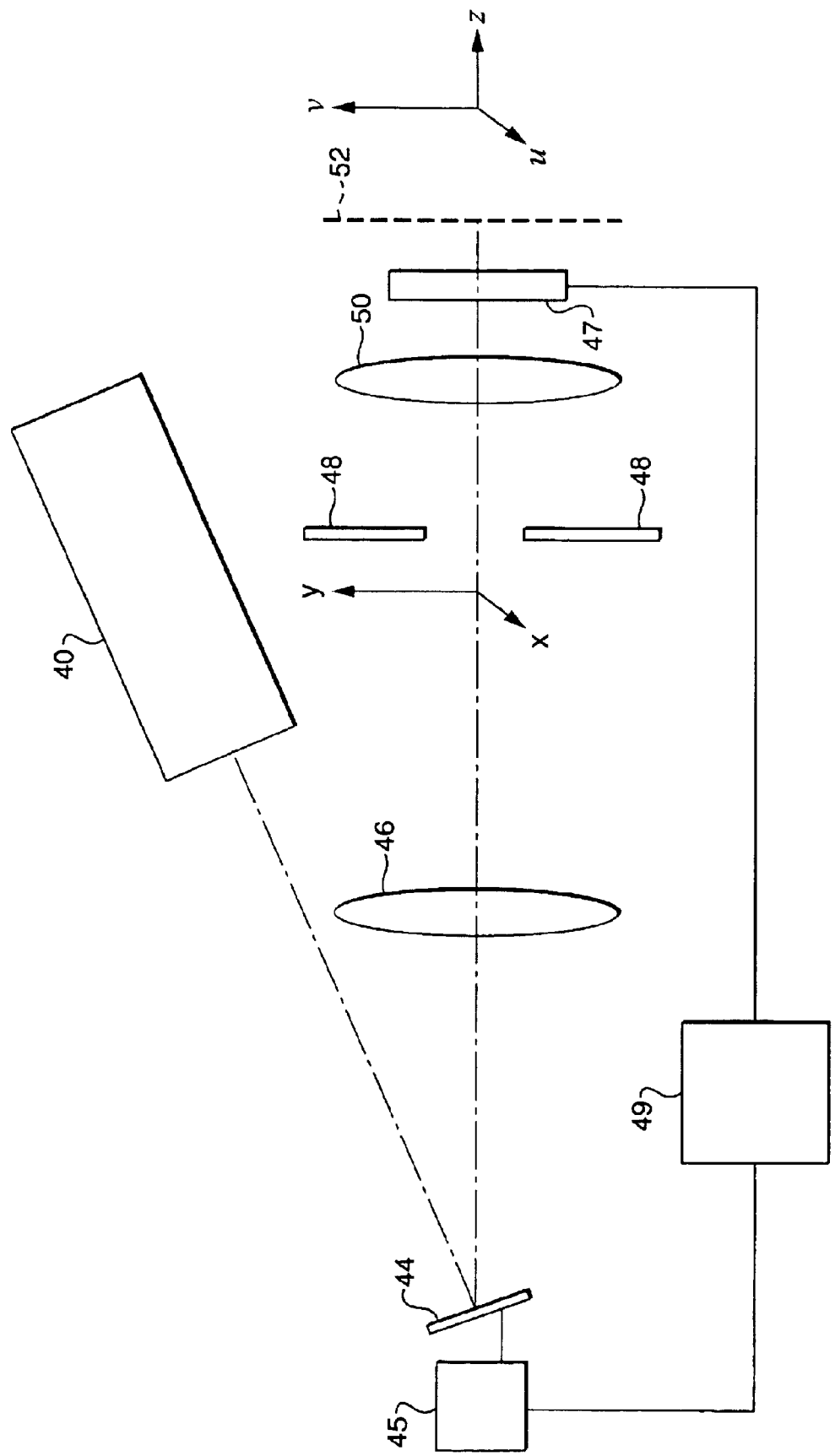
FIG. 6 shows an illustrative diagrammatic view of an imaging system in accordance with a further embodiment of the invention.

In accordance with another embodiment of the invention, a mathematical-electronic correction may be applied by Fourier transformation of the diffractive patterns as well as corresponding normalization of the diffractive intensity, to achieve a linear illumination intensity behavior. As shown in FIG. 6, such a system may include the laser line illumination source 40, GLV 44, lenses 46, 50, pupil 48 and imaging plane 52 as discussed above with reference to FIG. 4, as well as a Fourier transformation unit 45, a normalization unit 47, and a controller 49. The controller 49 adjusts the GLV 44 and causes the normalization unit 47 to modify the illumination to achieve a linear illumination intensity behavior.

Figure 7:
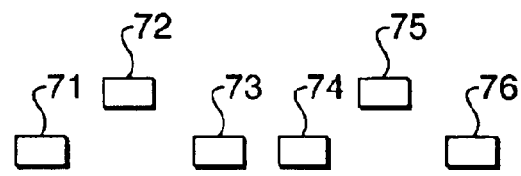
FIG. 7 shows an illustrative diagrammatic end view of a pixel-forming portion of a grating light valve in accordance with another embodiment of the invention.

As shown in FIG. 7, in accordance with another embodiment of the invention, a GLV may be employed that modifies the diffractive contribution of the diffractive units that form a pixel. A controller is employed to modify the GLV as discussed above with reference to FIG. 6. The GLV may be modified by changing the deflection pattern on the GLV to include a supplemental modulation of the diffractive units. For example, ribbons 71–76 of a GLV (shown in end view) may be modulated not simply to exhibit an alternating pattern, but to include another modulation pattern as well that inhibits the non-linear contributions as shown in FIG. 7. In this case, ribbons 71, 73, 74 and 76 may be activated as shown in FIG. 7.

Figure 8:
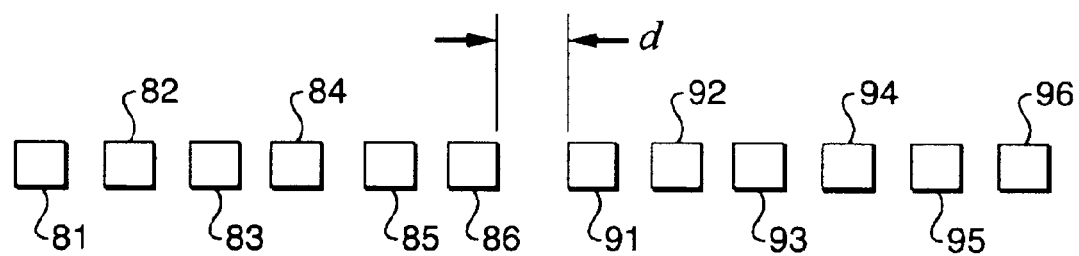
FIG. 8 shows an illustrative diagrammatic end view of two adjacent pixel-forming portions of a grating light valve in accordance with a further embodiment of the invention.

In accordance with another embodiment of the invention, a moderate lateral separation of the pixels by non-diffractive space may be employed to decrease the cooperative effect between neighboring pixels. For example, as shown in FIG. 8, a pixel-forming portion of a GLV including ribbons 81, 82, 83, 84, 85, 86 may be separated by a distance d from another pixel-forming portion of a GLV including ribbons 91, 92, 93, 94, 95, 96. This non-diffractive distance d may result in improved linear illumination intensity behavior of the diffractive modulator.

Figure 9:
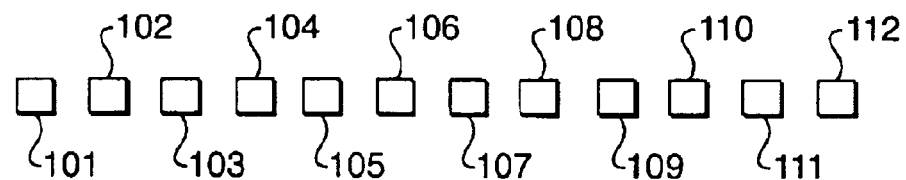
FIG. 9 shows an illustrative diagrammatic end view of a pixel-forming portion of a grating light valve in accordance with a further embodiment of the invention.

As shown in FIG. 9, in accordance with a further embodiment of the invention, the number of diffractive units per pixel may be increased. The number of ribbons that form a pixel, therefore, may be increased from six to, for example, eight as shown at 101, 102, 103, 104, 105, 106, 107 and 108 in FIG. 9. Improved illumination intensity behavior of the diffractive modulator may be achieved by using such a system.

Figure 10:
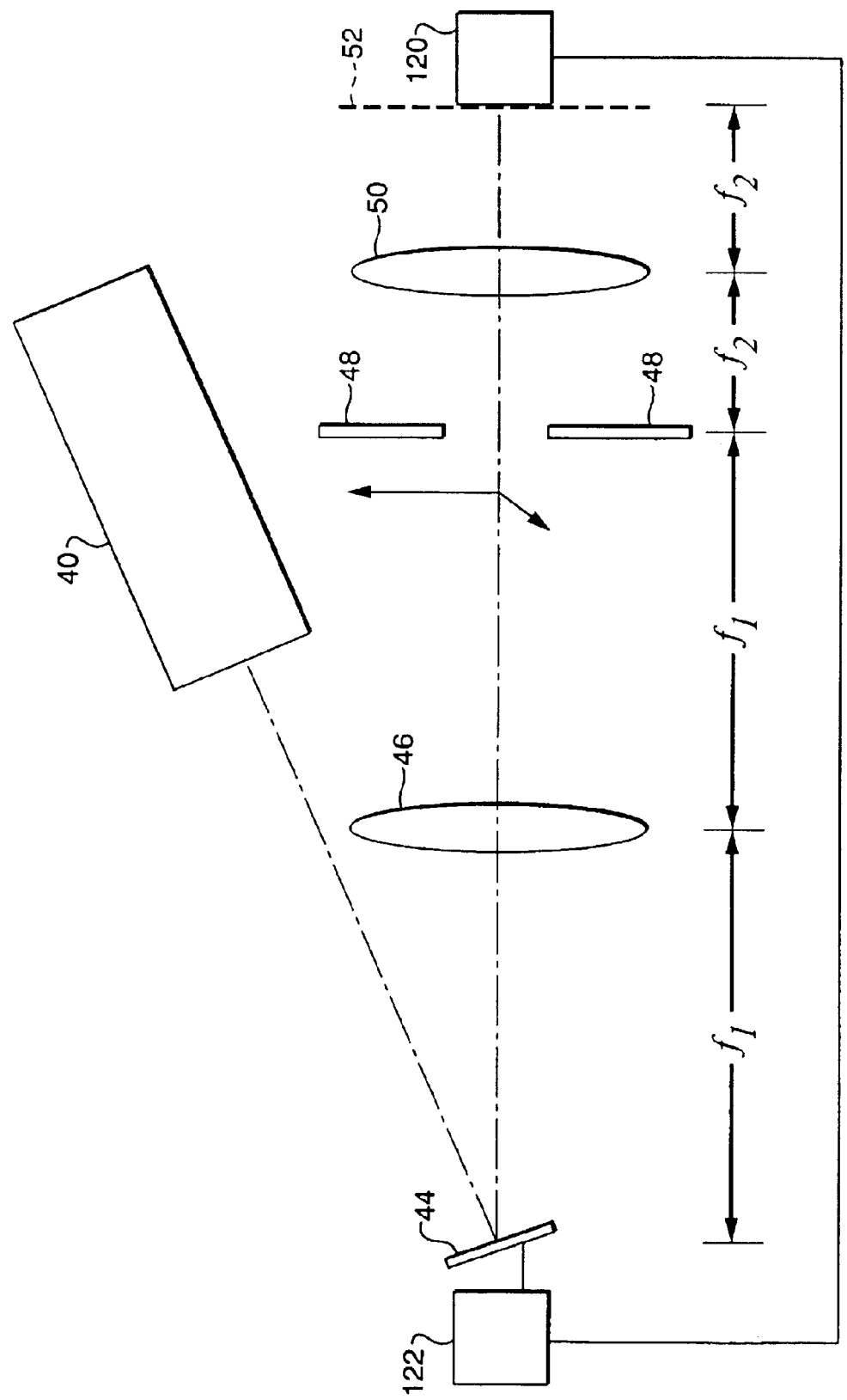
FIG. 10 shows an illustrative diagrammatic view of an imaging system in accordance with another embodiment of the invention.

Operation of any of the above systems may be achieved in a variety of ways, including the use of a detector that samples the image at the image plane and provides feedback to reduce the non-linearities. As shown, for example, in FIG. 10, such a system may include the laser line illumination unit 40, GLV 44, lenses 46, 50, pupil 48 and imaging plane 52 as discussed above with reference to FIG. 4, as well as a detector 120 that is coupled to a controller 122, which controls the GLV. The detector 120 may be positioned outside of the range of the imaging media in the fast scan direction.

Those skilled in the art will appreciate that numerous modifications and variations may be made to the above disclosed embodiments without departing from the spirit and scope of the invention.

What is claimed is:

1. An imaging system including:

an illumination source for producing an illumination field;

a diffractive modulator for receiving the illumination field and producing a modulated illumination field;

a normalization unit for normalizing an intensity of the modulated illumination field;

imaging optics for directing said normalized modulated illumination field toward an imaging surface; and reduction means comprising a Fourier transformation unit for reducing coherence and spatial cross-talk effects in said normalized modulated illumination field.

2. The imaging system as claimed in claim 1, wherein said reduction means includes diffractive elements means for modifying the number of diffractive elements of a pixel-forming portion of the modulator.

3. The imaging system as claimed in claim 1, wherein said diffractive modulator is a grating light valve.

4. The imaging system as claimed in claim 1, wherein said reduction means includes supplemental modulation means for directing the modulator to provide a supplemental modulation in addition to an alternating modulation pattern.

5. The imaging system as claimed in claim 4, wherein said supplemental modulation means includes a controller that is coupled to the modulator.

6. The imaging system as claimed in claim 1, wherein said reduction means includes spacer means for modifying the distance between adjacent pixel-forming portions of the modulator.

7. The imaging system as claimed in claim 6, wherein said spacer means includes a controller that is coupled to the modulator.

8. The imaging system as claimed in claim 6, wherein said diffractive elements means includes a controller that is coupled to the modulator.

* * * * *